United States Patent [19]

Woudenberg et al.

[11] Patent Number: 4,569,495

[45] Date of Patent: Feb. 11, 1986

[54] SUPPORT FOR TRAFFIC CONTROL DEVICE

[75] Inventors: John D. Woudenberg, Phoenix; Ronald B. Jones, Chandler, both of Ariz.

[73] Assignee: Material Sales, Inc., Tempe, Ariz.

[21] Appl. No.: 639,476

[22] Filed: Aug. 10, 1984

[51] Int. Cl.$^{4}$ .............................................. F16M 13/00

[52] U.S. Cl. ...................................... 248/160; 40/608; 40/612; 404/10

[58] Field of Search ........................ 248/160, 274, 903; 404/9, 10; 40/608, 612, 610, 606; 116/63 R, 63 P

[56] References Cited

U.S. PATENT DOCUMENTS

| | | | |
|---|---|---|---|
| 1,666,862 | 4/1928 | McHenry | 404/9 X |
| 3,380,428 | 4/1968 | Abrams | 404/10 X |
| 3,792,679 | 2/1974 | Duckett et al. | 40/608 X |
| 3,913,518 | 10/1975 | Kaplan | 248/160 X |
| 3,950,873 | 4/1976 | Stehle et al. | 40/612 X |
| 4,061,435 | 12/1977 | Schmanski et al. | 404/10 |
| 4,092,081 | 5/1978 | Schmanski | 404/10 |
| 4,240,766 | 12/1980 | Smith et al. | 248/160 X |
| 4,245,922 | 1/1981 | Auriemma | 404/10 |
| 4,297,050 | 10/1981 | Gmelch | 404/10 |
| 4,298,292 | 11/1981 | Sweeney | 404/10 |

*Primary Examiner*—J. Franklin Foss
*Assistant Examiner*—David L. Talbott
*Attorney, Agent, or Firm*—Gregory J. Nelson

[57] ABSTRACT

A barricade post for supporting a reflectorized panel and warning light comprising an integrally formed member molded of a elastomeric material having a generally U-shaped cross-section. The upper end of the post defines a shoulder to support a warning light. The intermediate section of the post is generally of uniform cross-section and is adapted for securement of the reflectorized panel by bolts or similar mechanical fasteners. The lower pedestal portion of the post diverges outwardly and termimates at a base. The lower pedestal portion is reinforced by diagonally extending ribs so the unit will resist breaking if impacted by a vehicle.

5 Claims, 7 Drawing Figures

SUPPORT FOR TRAFFIC CONTROL DEVICE

The present invention relates to a support for a traffic control device and more particularly relates to a barricade with a flexible post for supporting reflectorized traffic control signs and warning lights.

Barricades of different types are widely used for traffic control, particularly to warn motorists of temporary conditions as a result of road construction and repair and for delineating the flow of traffic in these situations. These barricades are of several different types, some of which are A-frame construction having one or more reflectorized panels and in some cases supporting a warning light. This type of barricade is normally used to warn of a hazard such as a ditch or other excavation. Similarly, another type of traffic control device known as a vertical panel barricade is commonly used. These generally consist of a single post which supports a reflectorized panel. The upper end of the post carries a battery operated lamp which may produce either a constant or flashing signal to further attract the attention of motor vehicle drivers. The vertical panel barricade generally mounts on a heavy baseplate and these type of devices are often used to delineate traffic as for example to re-route a lane of traffic around a construction area. Typically, vertical panel barricades are constructed with the post and base being metal which in some cases is painted or galvanized to protect the metal components from weather.

One serious problem exists with barricades, particularly the vertical panel barricades of the type described above. Due to their metal construction, these types of barricades are susceptible to damage as a result of impact of vehicles. It is not at all uncommon for vehicles to strike the barricades, particularly at night or under other low-light conditions. In such a case, the posts are usually are severely damaged and bent to the point where the barricades must be returned to a shop and repaired. This is an expensive and time-consuming proposition and requires transporting the barricades to the shop, repairing and returning them. Meanwhile, replacement barricades must be brought to the jobsite. In addition, during the period prior to replacement with a new barricade, a hazard can be presented to the traffic due to the damaged and out-of-service barricade. An attendant problem is that the barricades also due to their construction can impart severe damage to the vehicle which inadvertantly strikes the barricade. The hazard may also be presented to personnel in the area inasmuch as an impacted barricade may temporarily become a missile-like object which could cause severe injury.

In view of the foregoing, there exists a substantial need in the industry for a barricade of improved design which is durable, will resist impact and which can be inexpensively manufactured. Briefly, and in accordance with the foregoing, the present invention comprehends a barricade having a vertical post which is designed to support and accomodate a reflectorized panel along the upper part of the post. The upper end of the post is provided with an appropriate shoulder for reception of a conventional warning light. The post is constructed of a suitable elastomeric material which will deflect under impact and then return to its normal vertical position. The post is configured having a transversely extending web portion and flanges at either edge. A lower portion of the post tapers outwardly so that the transverse dimension is greatest at the bottom. The approximate lower one-third of the post which is tapered, is reinforced by ribs which extend in angular fashion between the opposite side flanges so that the post has the greatest resistance to the imposed bending momentum upon impact in this area. The preferred materials are nylon or nylon reinforced with fiberglass.

The above and other objects and advantages of the present invention will become more apparent from the following description, claims and drawings in which:

Figure 1:
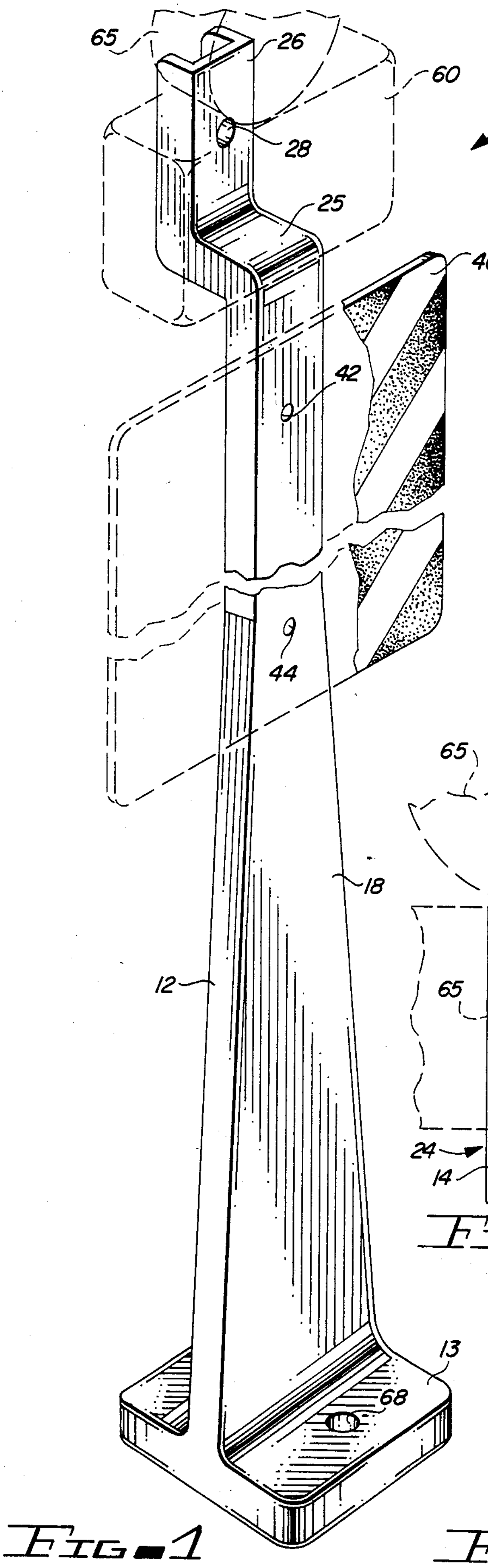
FIG. 1 is a front perspective view of the vertical panel traffic barricade of the present invention showing the flasher and reflectorized panel in position.
Figure 3:
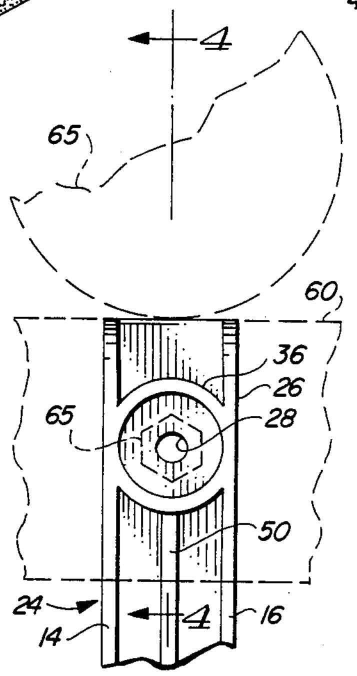
FIG. 3 is a rear view of the upper end of the vertical panel post of the present invention.
Figure 2:
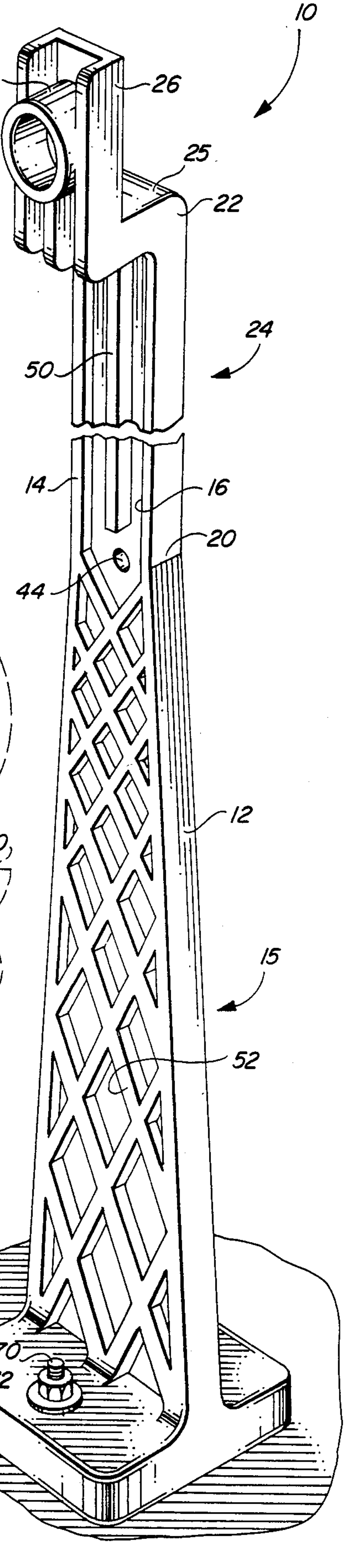
FIG. 2 is a rear perspective view of the vertical panel post of the present invention.
Figure 4:
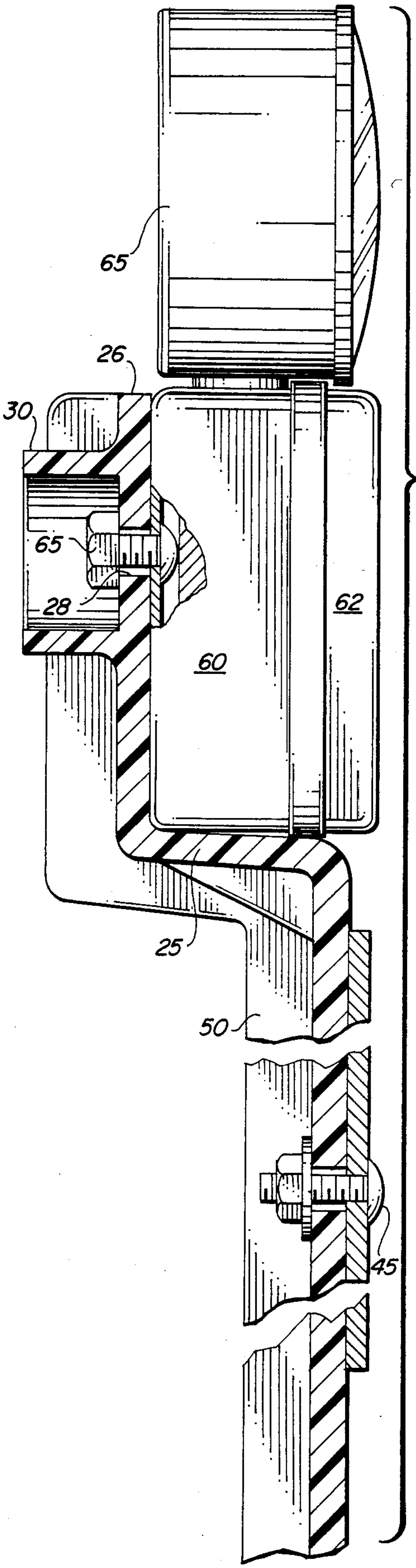
FIG. 4 is a sectional view taken along lines 4—4 of FIG. 3.

Turning now to the drawings, the vertical panel barricade post of the present invention is generally designated by the numeral 10 and has a generally elongate upstanding body or post member 12 which extends from rectangular base 13. The post member has a cross-sectional configuration throughout its length which is generally U-shaped having opposite side flanges 14 and 16 which extend to the rear of the post and are joined by intermediate web portion 18. Typically, the overall height of the post would be approximately 40" with the approximate lower one-third of the post forming a pedestal section 15 having its greatest transverse dimension at base 13 and being truncated tapering inwardly to a location at approximately elevation numeral 20. The remainder of the vertical extension from elevation 20 to elevation 22 is of uniform cross-sectional dimension and forms a column portion 24. The upper or head end of the post is generally L-shaped having a shoulder portion 25 for receipt of a warning light and an upwardly extending leg 26. A bore 28 is provided in the leg member 26 for securement of a light. An annular hub member 30 surrounds bore 28 projecting from the rear side of the leg 26. The terms "front" and "rear" are relative and the term "front" refers to the surface or side of the post on which the reflector panel 40 is mounted and the "rear" refers to the obverse side.

Generally rectangular reflectorized panel 40 is secured to the post at mounting holes 42 and 44 located at spaced apart locations in the intermediate column portion 24 of the post. The reflectorized panel is generally a rigid plastic or metal coated with an appropriate phosphorescent material which is light-gathering. The panel is secured at holes 42 and 44 by appropriate fasteners 45 and when in position will serve to stiffen and reinforce the column portion of the post. In this way, the column portion 24 can be of reduced cross-sectional area due to the reinforcing and stiffening effect imparted by the attached panel. Some further stiffening may be required and this is accomplished by means of a centrally located axially extending rib 50 which extends from annular hub 30 along the column intermediate opposite flanges 14 and 16 terminating at a location adjacent lower mounting hole 44.

The lower pedestal portion of the post is truncated increasing in cross-sectional area as it approaches the base 12. It will be apparent that in case of impact, the greatest bending moment and hence the greatest shear forces are generally experienced in the lower part of the post. To this end and to further increase the resistance to these forces, a plurality of diagonally extending reinforcing ribs 52 are provided at the rear face of the post in this area. The reinforcing ribs preferably extend between the opposite side flanges 14 and 16 in a cross-cross or honeycomb pattern, thus, serving to transfer shear stress to the opposite side ribs which have greater depth and area than the intermediate web 18.

For convenience and strength, the pedestal is formed as an integral unit of an appropriate synthetic material having sufficient rigidity to support the panel and yet having suitable elastomeric qualities so that the post may bend and deflect to absorb impact without breaking. Preferably, the entire post is integrally molded by injection molding techniques from suitable material such as super-tough (ST) nylon or nylon reinforced with five percent fiberglass. Other synthetic materials known to those familiar with the plastic arts may also be used.

In use, the pedestal is completed as a barricade by attaching rectangular reflector panel 40 in bolt holes 42 and 44 by fasteners 45. Similarly, warning light 60 is secured at the head end of the post. Typical light unit 60 has a generally rectangular battery housing member 62 which may be positioned on shoulder 25 and secured in place by a bolt 65 extending into the housing 62 through hole 28. The head of bolt 65 is recessed to partially protect against tampering and theft of the light unit. The annular hub 30 makes it more difficult to remove the light unit. The light unit 60 is typically provided with a lamp 65 which may provide a continual source of light or may provide intermittent flashing light signals. Typically, the light unit includes a photoelectric sensor to turn the lamp on at dusk and off at dawn. These are conventionally known and form no part of the present invention.

Figure 6:
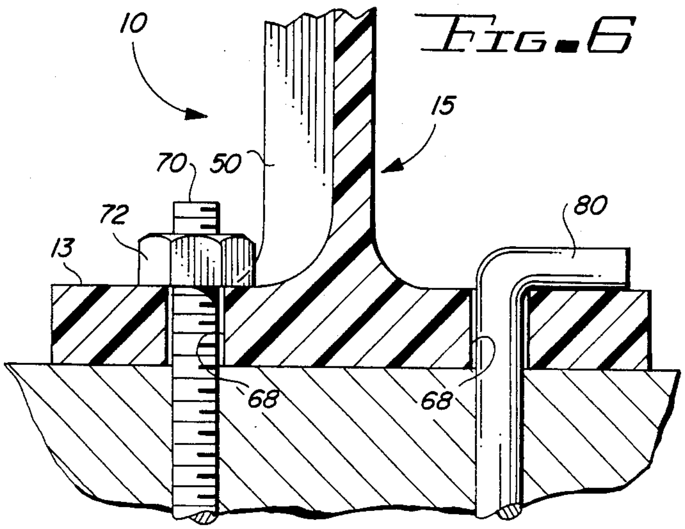
FIG. 6 is an enlarged detail view showing several alternative methods of securing the post of the present invention at a job location.

With the unit assembled as described above, the unit can be positioned at the desired location in several ways. Referring to FIG. 6, the rectangular base 13 may be secured to a weighted baseplate by bolt 70 and nut 72. The weighted baseplate is generally larger than base 12 and provides suitable area and weight to prevent the unit from tipping. The barricade of the present invention when secured to a weighted portable baseplate can be moved about as required.

Another means of securing the pedestal is also shown in FIG. 6. This is a semi-permanent means of securement in which an L-shaped ground stake 80 is inserted into the bore 68 and into the subjacent earth or asphalt. This manner of securement has the advantages of making theft or unauthorized removal of the unit more difficult.

Figure 7:
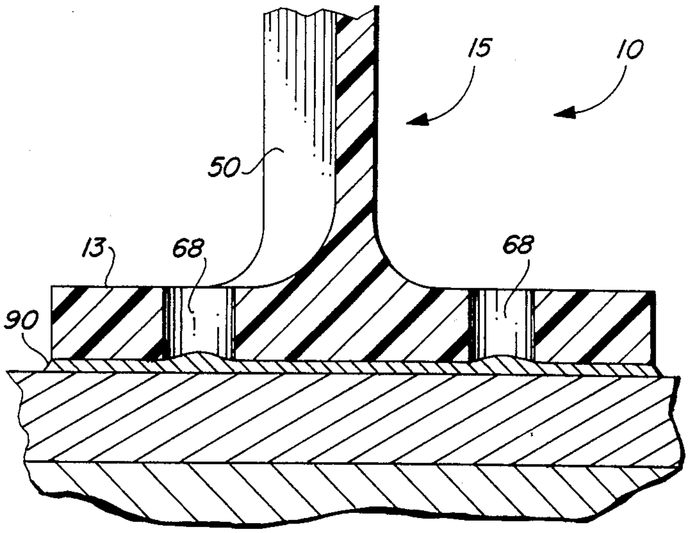
FIG. 7 is a view similar to FIG. 6 showing still another method of securing the post in place.

Another method of securing the barricade in place is shown in FIG. 7. Here the underside of baseplate 13 is coated with a suitable bonding agent or adhesive 90 and in this way joined to the underlying pavement 90. Again, this type of securement is for a semi-permanent installation and when it is necessary to remove the barricade, the base can be manually pried from the pavement. Various adhesives known to those skilled in the art such as epoxies are suitable for this purpose.

Figure 5:
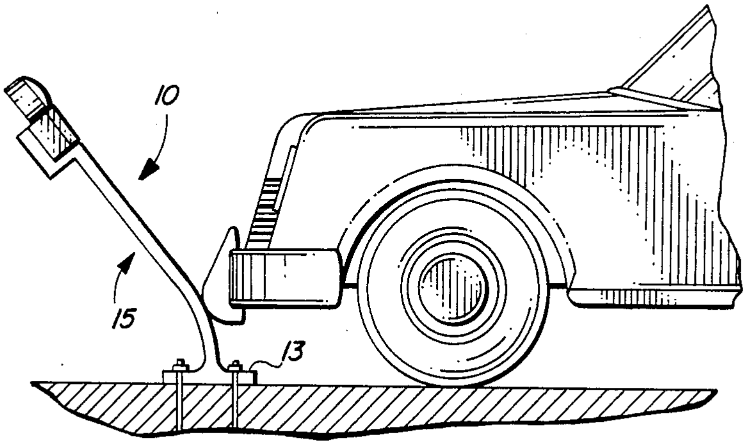
FIG. 5 is a pictorial view illustrating an impact between a vehicle and the barricade of the present invention.

It will be apparent that the above-described invention provides a highly versatile, durable and efficient barricade post. As illustrated in FIG. 5, the unit is particularly resistant to inadvertant minor impacts that are often encountered in the use of such barricades. The impact will be absorbed by the unit, the unit being elastic is allowed to bend and upon removal of the impact force, the unit will return to its normal vertical upright position.

It will be apparent to those skilled in the art that various modifications, alterations and changes may be made to the barricade post described herein without departing from the spirit and scope of the appended claims. To the extent that these changes, alterations and modifications do not depart from the spirit and scope of the appended claims, they are intended to be encompassed therein.

We claim:

1. A barricade and warning post for mounting a warning light and a reflectorized panel, said post comprising:

(a) a generally elongate integrally formed body member fabricated from a resilient material having an upper end and a base;

(b) said body member having opposite side edges which taper upwardly and inwardly at least along a substantial portion of its height, said body having a generally U-shaped cross-section with flanges at opposite sides, said body including a generally axially extending rib member extending at least a portion of the height of said post in said web portion, said upper end of said post defining an off-set shoulder for securement of a warning lamp aligned with the longitudinal axis of the post and further defining an area adapted to receive a rigid attachment which attachment serves to reinforce said body; and (c) reinforcing members extending between the opposite side flanges along at least a portion of the post whereby the post has the greatest resistance to imposed bending momentum upon impact in the area above the base.

2. The post of claim 1 wherein said reinforcing members form a generally criss-cross pattern.

3. The post of claim 1 formed as an integral unit by injection molding.

4. The post of claim 1 wherein said barricade post is formed from nylon.

5. The post of claim 1 wherein said upper end defines a bore surrounded by an annular hub adapted to secure said warning light thereto.

* * * * *